(12) United States Patent
Coteus et al.

(10) Patent No.: US 9,454,422 B2
(45) Date of Patent: Sep. 27, 2016

(54) ERROR FEEDBACK AND LOGGING WITH MEMORY ON-CHIP ERROR CHECKING AND CORRECTING (ECC)

(71) Applicant: International Business Machines Corporation, Armonk, NY (US)

(72) Inventors: Paul W. Coteus, Yorktown, NY (US); Hillery C. Hunter, Chappaqua, NY (US); Charles A. Kilmer, Essex Junction, VT (US); Kyu-hyoun Kim, Mount Kisco, NY (US); Luis A. Lastras-Montano, Cortlandt Manor, NY (US); Warren E. Maule, Cedar Park, TX (US); Vipinchandra Patel, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 14/168,460

(22) Filed: Jan. 30, 2014

(65) Prior Publication Data
US 2015/0212885 A1  Jul. 30, 2015

(51) Int. Cl.
*G11C 29/00* (2006.01)
*G06F 11/07* (2006.01)
*G06F 11/10* (2006.01)

(52) U.S. Cl.
CPC ......... *G06F 11/0772* (2013.01); *G06F 11/073* (2013.01); *G06F 11/1048* (2013.01)

(58) Field of Classification Search
CPC ............... G06F 11/10; G06F 11/1068; G06F 11/1056; G06F 11/073; G06F 11/0772; G06F 11/0763
See application file for complete search history.

(56) References Cited

U.S. PATENT DOCUMENTS

| | | | |
|---|---|---|---|
| 5,748,873 A | 5/1998 | Ohguro et al. | |
| 5,754,567 A * | 5/1998 | Norman ............... | G06F 11/1068 365/185.09 |
| 5,912,906 A | 6/1999 | Wu et al. | |
| 6,651,212 B1 | 11/2003 | Katayama et al. | |
| 6,701,480 B1 * | 3/2004 | Karpuszka .......... | G06F 11/1056 714/764 |
| 6,996,017 B2 | 2/2006 | Scheuerlein et al. | |
| 7,096,407 B2 | 8/2006 | Olarig | |
| 7,266,747 B2 | 9/2007 | Foss | |
| 7,310,278 B2 | 12/2007 | Bright et al. | |
| 7,408,824 B2 | 8/2008 | Hoya et al. | |
| 7,721,140 B2 | 5/2010 | Dell et al. | |
| 7,885,128 B2 | 2/2011 | Fujiwara | |

(Continued)

FOREIGN PATENT DOCUMENTS

JP   2001175542 A   6/2001

OTHER PUBLICATIONS

Yoon, Doe Hyun et al., "Flexible Cache Error Protection using an ECC FIFO", ACM, Nov. 2009.

(Continued)

*Primary Examiner* — Shelly A Chase
(74) *Attorney, Agent, or Firm* — Toler Law Group, P.C.

(57) ABSTRACT

Error checking and correcting (ECC) may be performed in an on-chip memory where an error is corrected by a controller and not the on-chip memory. The controller may be flagged to show that an error has occurred and where it has occurred in the memory. The controller may access ECC bits associated with the error and may fix incorrect data. The error checking may be done in parallel with read operations of the memory so as to lower latency.

13 Claims, 7 Drawing Sheets

(56) References Cited

U.S. PATENT DOCUMENTS

| | | | |
|---|---|---|---|
| 8,195,978 B2 | 6/2012 | Flynn et al. | |
| 8,239,744 B2* | 8/2012 | Shirai | G06F 11/1068 714/800 |
| 8,289,790 B2 | 10/2012 | Rooney et al. | |
| 8,392,797 B2* | 3/2013 | Cheng | G06F 11/1068 714/763 |
| 8,413,007 B2 | 4/2013 | Pawlowski et al. | |
| 8,413,016 B2* | 4/2013 | Honda | G06F 11/0763 714/764 |
| 8,418,026 B2 | 4/2013 | D'Abreu et al. | |
| 8,423,839 B2 | 4/2013 | Yoel et al. | |
| 2003/0070054 A1 | 4/2003 | Williams et al. | |
| 2004/0163015 A1 | 8/2004 | Nadeau-Dostie et al. | |
| 2008/0256281 A1 | 10/2008 | Fahr et al. | |
| 2010/0058144 A1 | 3/2010 | Rohleder | |
| 2010/0287446 A1 | 11/2010 | Post et al. | |
| 2011/0041016 A1 | 2/2011 | O'Connell | |
| 2011/0072332 A1 | 3/2011 | Tomlin | |
| 2011/0161784 A1 | 6/2011 | Selinger et al. | |
| 2012/0195144 A1 | 8/2012 | Ide et al. | |
| 2013/0010557 A1 | 1/2013 | Rooney et al. | |
| 2013/0024744 A1 | 1/2013 | Takizawa | |
| 2013/0117620 A1* | 5/2013 | Joo | G11C 16/10 714/746 |
| 2013/0117631 A1 | 5/2013 | Gruner et al. | |
| 2013/0179724 A1 | 7/2013 | Cordero et al. | |
| 2013/0191703 A1 | 7/2013 | Meaney et al. | |
| 2013/0212431 A1* | 8/2013 | Ong | G06F 15/167 714/15 |
| 2013/0282961 A1 | 10/2013 | Minamimoto | |
| 2014/0013187 A1* | 1/2014 | Blaunstein | G06F 13/1689 714/773 |

OTHER PUBLICATIONS

Tanzawa, Toru et al., "A Compact On-Chip ECC for Low Cost Flash Memories", IEEE Journal of Solid-State Circuits, vol. 32, No. 5, May 1997.

Altera—DDR and DDR2 SDRAM ECC Reference Design, Application Note 415, Altera Corporation, Version 1.0, Jun. 2006, 20 pp.

* cited by examiner

ERROR FEEDBACK AND LOGGING WITH MEMORY ON-CHIP ERROR CHECKING AND CORRECTING (ECC)

I. FIELD

The present disclosure is generally related to computing hardware and data transmissions, and more particularly, to error checking and correction (ECC) and associated storage processes.

II. DESCRIPTION OF RELATED ART

Electronic devices, such as computers, modems, facsimile machines, and mobile devices, often include memory devices to store data. As technological advances increase memory capacity and memory chip density, smaller geometries are used to manufacture memory cells. However, smaller geometries may cause memory failure rates to increase. A memory failure may result in incorrect data being transmitted in response to a memory request. Thus, increasing error protection at a memory is useful.

One way to improve error protection is to include an Error Checking and Correcting (ECC) module in a memory device to check for errors and correct detected errors at the memory device. However, an ECC process may add significant latency (e.g., time corresponding to the ECC checking and correcting data before it is transmitted) to a memory request at the memory device. Further, an amount of additional latency may depend on whether an error is present (e.g., a variable latency memory device), which may be unknown before the memory request is transmitted to the memory device. Modern memory interfaces (e.g., dynamic random-access memory (DRAM) interfaces) may use a fixed latency signal transmission system. In a fixed latency signal transmission system, a controller may need to know when to expect a response to a memory request. A fixed latency signal transmission system that includes the variable latency memory device may need to ensure that the variable latency memory device will always return data with a worst-case latency (e.g., a latency that corresponds to the ECC module finding and correcting an error) to ensure that the variable latency memory device will always transmit data with a fixed latency. However, assuming that the variable latency memory device will always return data at the worst-case latency may negatively impact a performance associated with the memory device.

III. SUMMARY

A particular embodiment includes error checking and correcting (ECC) in an on-chip memory where an error is corrected by a controller and not the on-chip memory. The controller may be flagged to show that an error has occurred and where it has occurred in the memory. The controller may access ECC bits associated with the error and may fix incorrect data. The error checking may be done in parallel with read operations of the memory so as to lower latency.

In a particular embodiment, a method includes receiving, at a memory device, from an external controller, a first request for data at a memory location of a memory array. The method further includes transmitting data corresponding to the memory location to the external controller in response to the request for data. The method further includes determining, at an error check module of the memory device, whether a data error is present at the memory location. The method further includes, when the data error is present, transmitting an error flag from the memory device to the external controller. The method further includes, after transmitting the error flag, receiving a second request at the memory device corresponding to the data from the external controller. The method further includes, in response to receiving the second request, transmitting data correction information from the memory device to the external controller.

In another particular embodiment, an apparatus includes a memory array configured to store data. The apparatus further includes an input-output port configured to receive, from an external controller, a first request for data at a memory location of the memory array. The input-output port is further configured to transmit, to the external controller, data corresponding to the memory location in response to the request for data. The apparatus further includes an error check module configured to determine whether a data error is present at the memory location. The apparatus further includes an error pin configured to transmit an error flag to the external controller in response to receiving a signal from the error check module indicating that the data error is present. After transmitting the error flag, the input-output port is configured to transmit data correction information in response to receiving a second request corresponding to the data.

In another particular embodiment, a non-transitory computer readable medium stores instructions that, when executed by a processor, cause the processor to receive, at a memory controller of a memory device, from an external controller, a request for data at a memory location of a memory array. The non-transitory computer readable medium further stores instructions that, when executed by a processor, cause the processor to transmit data corresponding to the memory location to the external controller in response to the request for data. The non-transitory computer readable medium further stores instructions that, when executed by a processor, cause the processor to determine, at an error check module of the memory device, whether a data error is present at the memory location. The non-transitory computer readable medium further stores instructions that, when executed by a processor, cause the processor to, when the data error is present, transmit an error flag from the memory device to the external controller. The non-transitory computer readable medium further stores instructions that, when executed by a processor, cause the processor to, after transmitting the error flag, receive a second request at the memory device corresponding to the data from the external controller. The non-transitory computer readable medium further stores instructions that, when executed by a processor, cause the processor to, in response to receiving the second request, transmitting data correction information from the memory device to the external controller.

One particular advantage provided by at least one of the disclosed embodiments reducing latency at the on-chip memory by passing on data without performing error correction at the on-chip memory. More particularly, the on chip memory may detect an error, but may not correct the error. Instead, the error may be corrected by an external controller. The error checking can be done in parallel during the read operations of the memory so as to have lowered latency. Thus, while a flagged error may take longer to correct under certain circumstances, there will be less latency in other instances where no error is present and where the data is passed on through without conventional delays at the on-chip memory.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
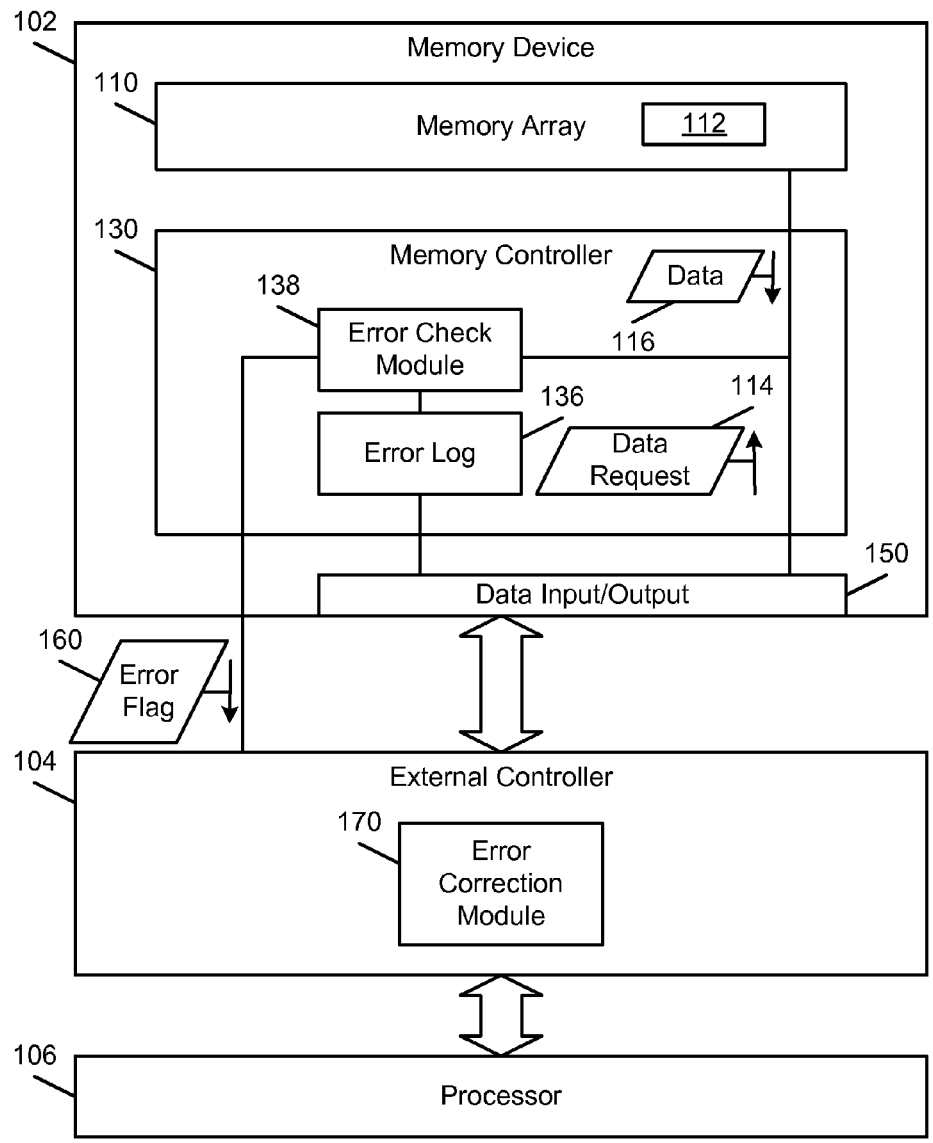
FIG. 1 illustrates an embodiment of a system configured to manage error correction feedback and logging on a memory microchip.

This document relates generally to reducing latency with regard to Error Checking and Correcting (ECC) involving an on-chip memory. ECC operations in a conventional on-chip memory may slow down the transmission of data regardless of whether there is an error in the data. An embodiment may reduce the latency at the on-chip memory by passing on data without performing error correction at the on-chip memory (and instead, performing the correction externally). More particularly, the on-chip memory may detect an error, but may not correct the error. Instead, the error is corrected by an external controller. The controller may be flagged to show that an error has occurred and its address may be identified. The external controller may then access the ECC bits and correct the error. The error checking can be done in parallel during the read operations of the memory so as to have lowered latency. Thus, while a flagged error may take longer to correct under certain circumstances (e.g., in instances where an error is present and is fixed by the controller), there will be less latency in other instances where no error is present and where the data is passed on through without conventional delays at the on-chip memory.

According to a particular embodiment, dynamic random access memory (DRAM) may not correct ECC, and an external controller may be used to correct an error. The controller may be aware of whether a memory device encountered an error, so the memory device may set (or reset) a pin in response to a detected error. The memory device may not need to guarantee to send back corrected data, so ECC checking may be done in parallel with read data transmissions. The parallel operations may reduce latency. A driver of the pin may be an open drain driver so that many devices may share the same signal. Where the controller detects there was an error inside a memory device, the controller may be able to access ECC bits for the specific data and associated information. For this purpose, the memory device may store error log information when an error is detected. The controller may halt further transactions in response to an error and may poll the stored error log information.

An error flag may be generated and sent to an external controller (e.g., a main memory processor) in response to a detected error. The error flag may occur immediately in response to the detection of the error, or may be initiated some time later. The memory device may perform error checking processing, but may not correct the data. The checking processes (e.g., ECC checking) may occur concurrently with data output because the memory device need not hold up data in the event of an error.

The external controller may halt a processing transaction in response to the error flag identifying the error. The external controller may look up an address associated with the error. In addition to identifying which request was not good, the error log may also include redundant bits (e.g., ECC bits). The external controller may include a buffer to store the information from the error log. The buffer may include a depth to store data according to how late the error flag may be sent in relation to the output data.

Having the external controller correct the error may take longer than correction on-chip, but in the absence of an error, data may be output at a relatively high rate. In certain scenarios, it may be more efficient to pay a higher latency penalty to correct an error (while enjoying relatively faster processing in the absence of an error), than to always pay a latency penalty for on-chip correction.

The error flag may alert the external controller that the error at the address is bad. During a retry, the external controller may issue a second read command to the latest (correct) address. The address may have been stored in a register and may be compared to an incoming address to determine whether the data has been stored. That is, the data associated with the error may have been corrected and saved to a register. The register may store more than one set of corrected data. The system may use tags to order and associate requests with data. Where an address is identified as being associated with a bad address, the corrected data may be retrieved from the register, rather than from the array. The data from the array would include the error. As such, a multiplexer may be used to route the correct data from the register, instead of data received from the array.

In response to receiving the error flag, the external controller may retry the read command to receive the corrected data. Where the data retrieved using the second read command may not cause another error flag to be set or otherwise communicated, the external controller registers that the correct data has been retrieved. Data correction processes thus may be done until the second retest data arrives from the multiplexor.

FIG. 1 illustrates an embodiment of a system 100 configured to manage error correction feedback and logging on a memory microchip. The system 100 may include a memory device 102 in communication with an external controller 104. The external controller 104 may communicate with a processor 106 of another or the same device.

The memory device 102 may include a memory array 110 having a memory bank 112. A memory controller 130 may include an error check module 138 and an error log 136. Error log information may include one or more of the following: a read address associated with where an error occurred, an ECC bit(s) associated with the error, and an error syndrome associated with the error. The memory controller 130 may receive a data request 114 via a data input/output (I/O) interface 150.

Data 116 may be received from the memory array 110. An error flag 160 may be communicated from the error check module 138 to the external controller 104. The external controller may include an error correction module 170.

Figure 2:
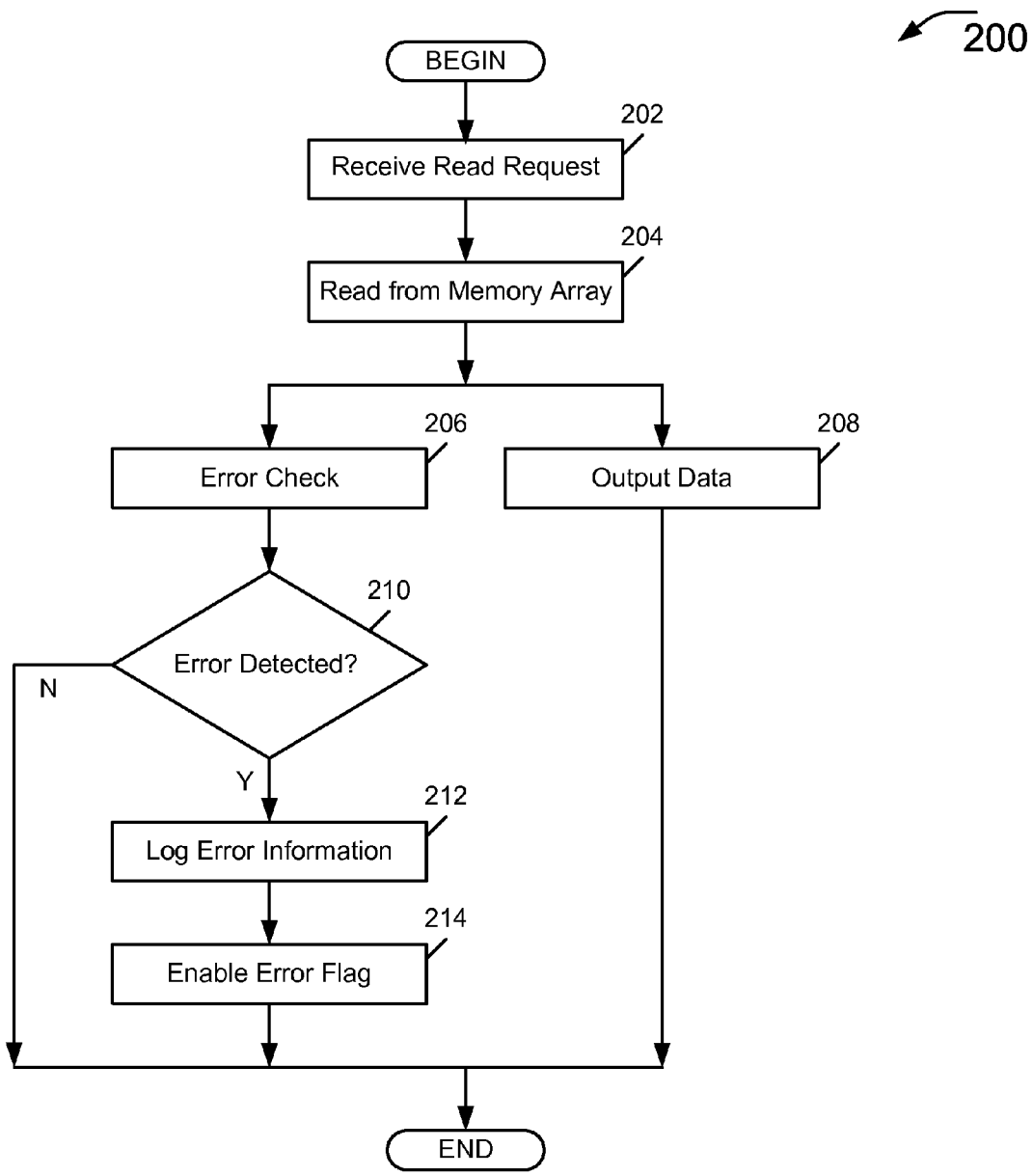
FIG. 2 illustrates a flowchart showing an embodiment of a method of managing error corrections that includes enabling an error flag and logging error information.

FIG. 2 illustrates a flowchart showing an embodiment of a method 200 of managing error corrections that includes enabling an error flag and logging error information. The method 200 may be from the perspective of a memory device. ECC may be performed on-chip. If an error is present, the corrected data may be pulled in at that address and an error flag is sent. The memory device may check address matches to match a best address to retrieve it from a special memory register or will otherwise retrieve it from a memory array.

In response to a detected error, the system may update and store the address associated with where the ECC error occurred. Correct data associated with the address may be stored in association with the address to be used on a future attempt. On a subsequent operation, a new address may be read. The new address may or may not be the same address as was stored. If it is a new address, data may be retrieved from the memory array. If the address is known (e.g., to be associated with stored, corrected data), a multiplexer may route the corrected data from storage to the I/O. In this manner, known bad addresses may receive corrected data based on an address match.

Turning more particularly to the processes of the flowchart, a read request may be received at 202. At 204, a read from the memory array may be initiated. Data may be output at 208. In parallel, an error check may be initiated at 206. Where an error is detected at 210, error information may be logged at 212. An error flag may be enabled at 214. The processes of the flowchart may be performed by a memory controller, such as the memory controller 130 of FIG. 1.

Figure 3:
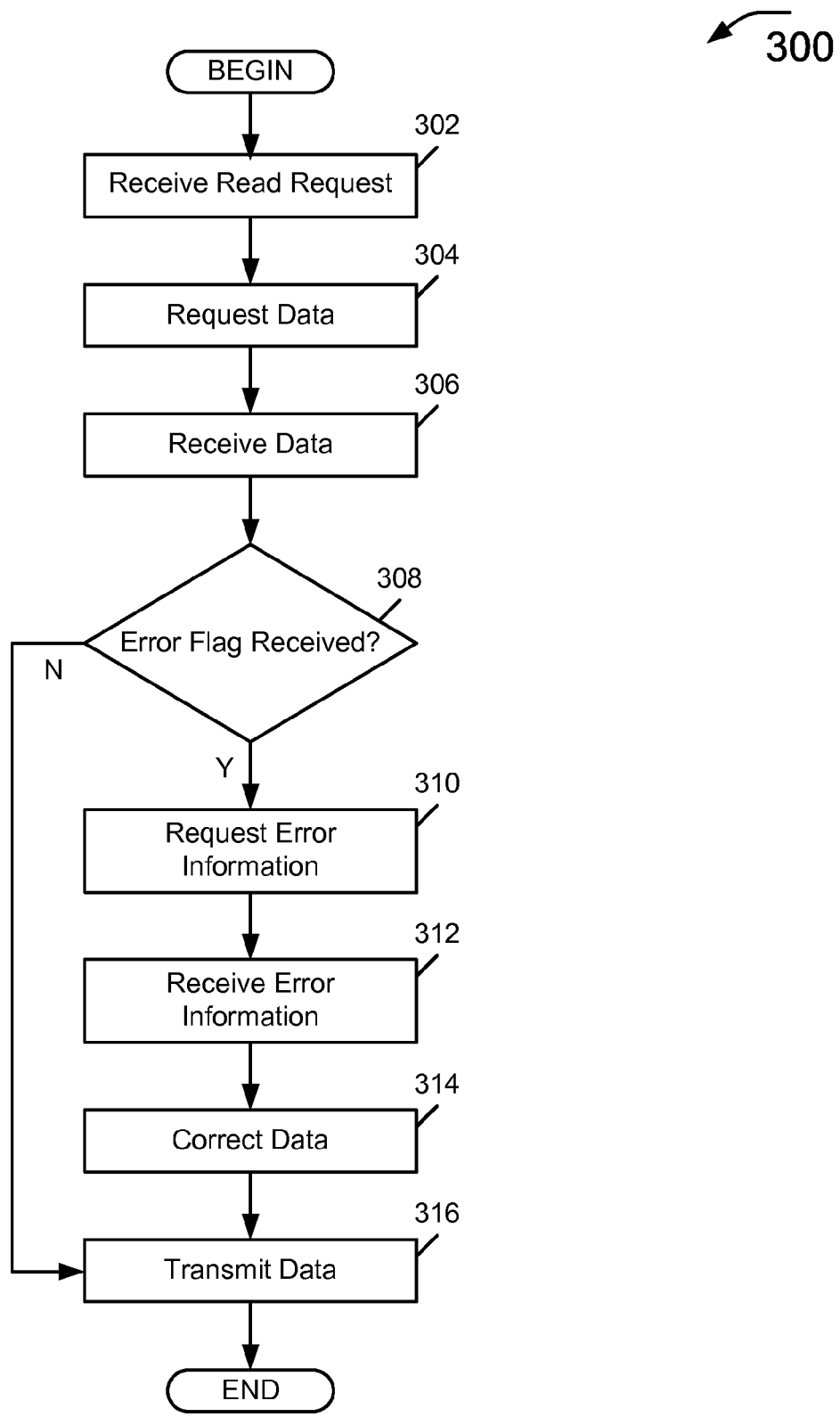
FIG. 3 shows a flowchart of an embodiment of a method of correcting data, as may be performed by a controller that is external to a memory device.

FIG. 3 shows a flowchart of an embodiment of a method 300 of correcting data, as may be performed by a controller that is external to a memory device. For example, the processes of the flowchart may be executed by the external controller 104 of FIG. 1.

Turning more particularly to the flowchart, a read request may be received at 302. Data may be requested at 304, and data may be received at 306. Where an error flag is received at 308, error information may be requested at 310. At 312, error information may be received and data may be corrected at 314. Data may be transmitted at 316. Where no error flag is received at 308, the data may be directly transmitted at 316.

Figure 4:
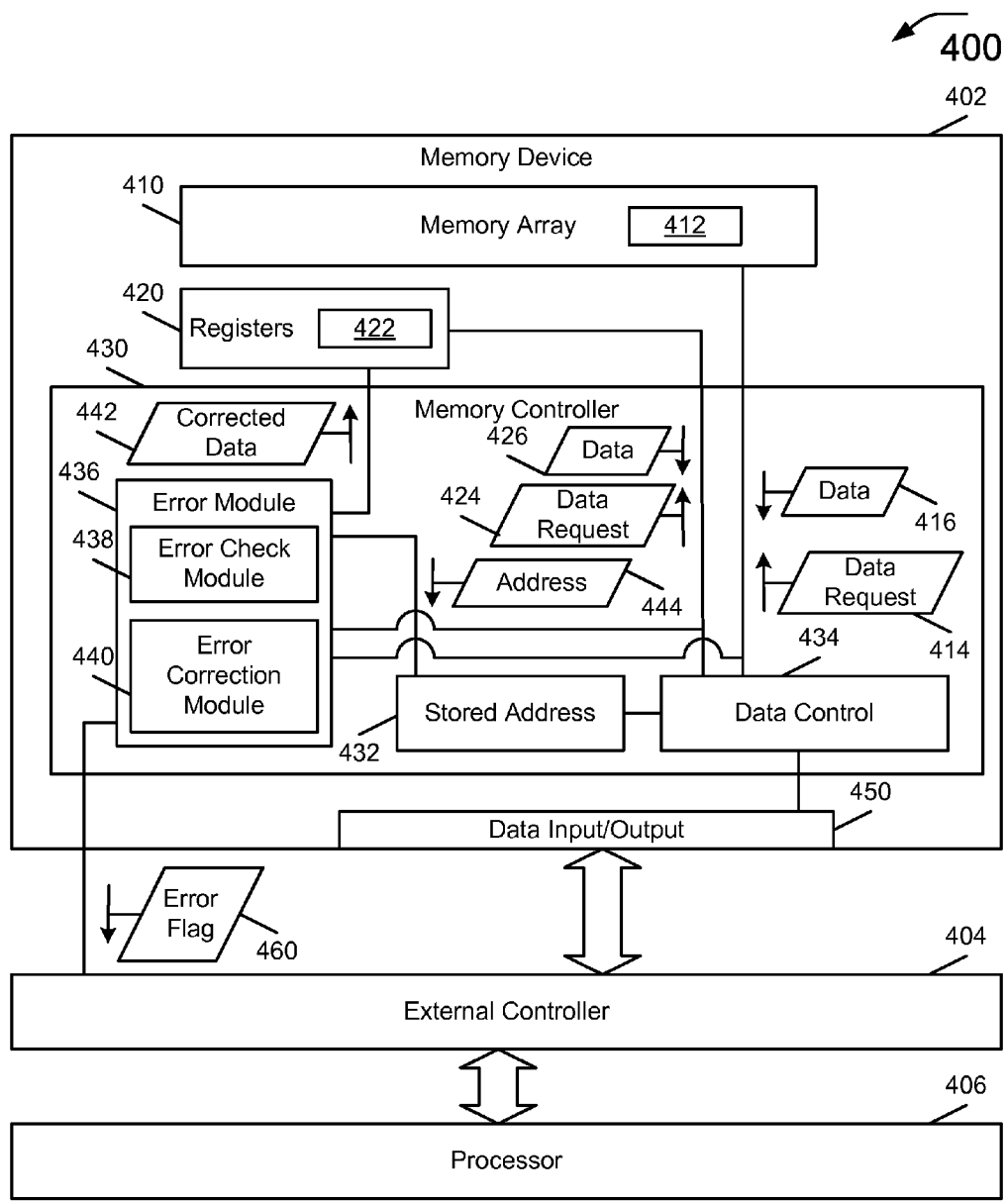
FIG. 4 illustrates an embodiment of a system configured to manage error correction and to efficiently pass on data.

FIG. 4 illustrates an embodiment of a system 400 configured to manage error correction and to efficiently pass on data. The system 400 includes a memory device 402 in communication with an external controller 404. The external controller 404 may communicate with a processor 406 configured to execute corrected data.

The memory device 402 may include a memory array 410 having memory modules 412. The memory device 402 may additionally include a plurality of registers 420, including a register 422.

A memory controller 430 may include a data request 414 received from the external controller and data 416 received from the memory array 410. Data 416 and a data request 414 may be communicated between the memory array 410 and a data control module 434 of the memory controller 430. The data control module 434 may additionally communicate with the registers 420 of the memory device 402. The communication between the registers 420 and the data control module 434 may include data 426 from the memory device 402 and a data request 424 from the external controller 404.

The data control module 434 may be coupled to a stored address module 432. The stored address module 432 may additionally be accessible to an error module 436. The error module 436 may include an error check module 438 and an error correction module 440. The error module 436 may communicate address information 444 to the stored address module 432. The error module 436 may additionally be in communication with the registers 420 and the data control module 434. The error module 436 may communicate corrected data 442 to the registers 420. A data I/O interface 450 of the memory controller 430 may communicate information, such as an error flag 460, to the external controller 404.

Figure 5:
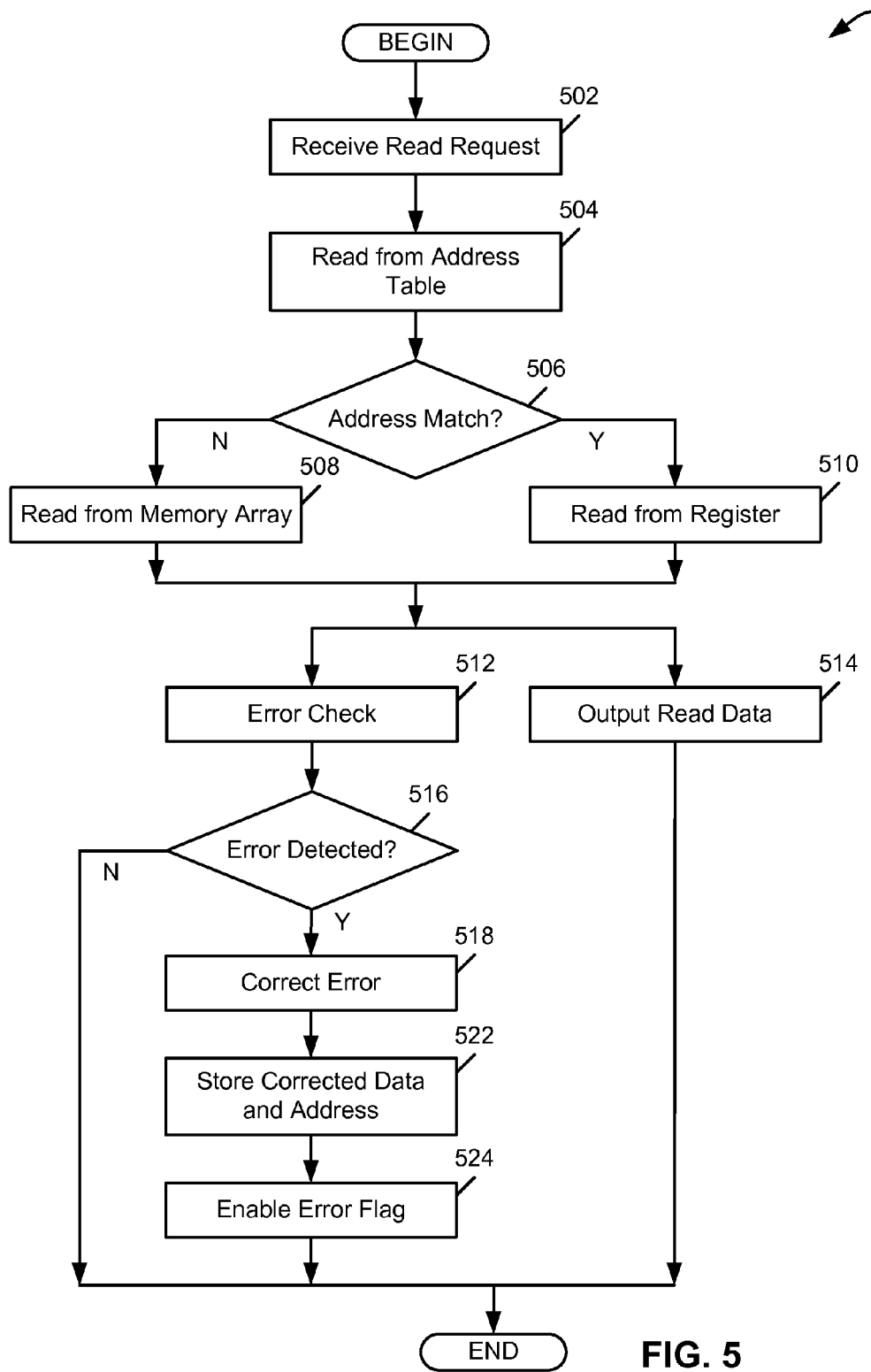
FIG. 5 is a flowchart of an embodiment of a method of correcting error data using an error flag.

FIG. 5 is a flowchart of an embodiment of a method 500 of correcting error data using an error flag. The processes of the method 500 may be performed by a memory device and a memory controller 426, such as the memory controller 426 of FIG. 4.

Turning more particularly to the processes of the flowchart, a read receive request may be received at 502. A read from an address table may be performed at 504. The address table of an embodiment may store more than one address. Where there is an address match at 506, data may be read at 510 from a register. Where there is alternatively no address match at 506 data may be read at 508 from the memory array.

Read data may be outputted at 514. In parallel, an error check may be initiated at 512. Where no error is detected at 516, data may be output and the method concludes. Alternatively, where an error is detected at 516, the error may be corrected at 518. Corrected data and associated addresses may be stored at 522, and an error flag may be enabled at 524.

Figure 6:
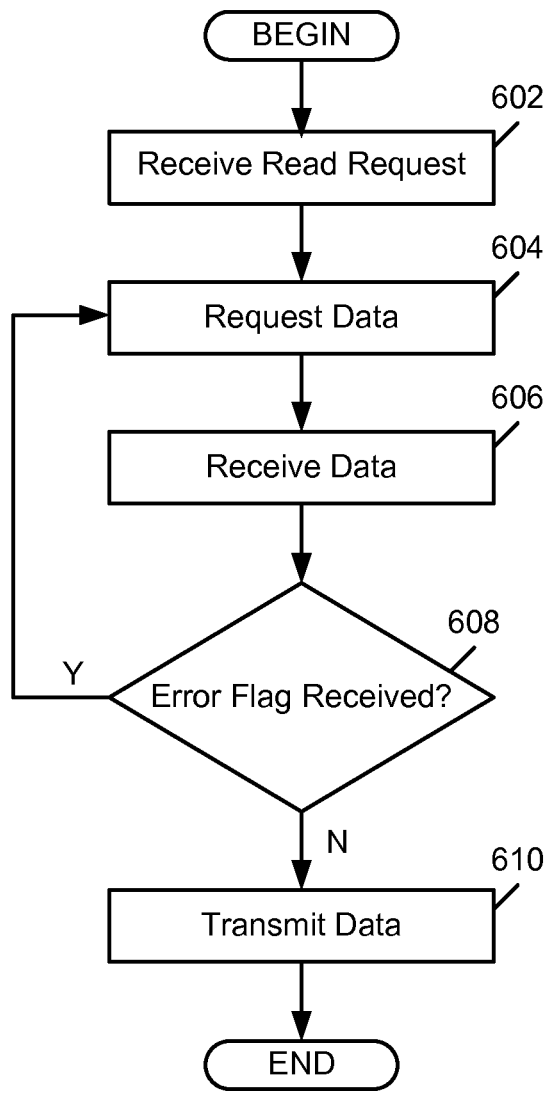
FIG. 6 shows a flowchart of an embodiment of a method of receiving and transmitting data.

FIG. 6 shows a flowchart of an embodiment of a method 600 of receiving and transmitting data. The processes may be performed by a controller that is external to a memory device, such as the external controller 404 shown in the system 400 of FIG. 4.

Turning to the processes of the flowchart, a read request may be received at 602. Data may be requested at 604, and the data may be received at 606. At 608, the method 600 may determine if an error flag has been received. Where the error flag has been received at 608, data may be requested at 604. Alternatively, where no error flag has been received at 608, the data may be transmitted at 610.

Figure 7:
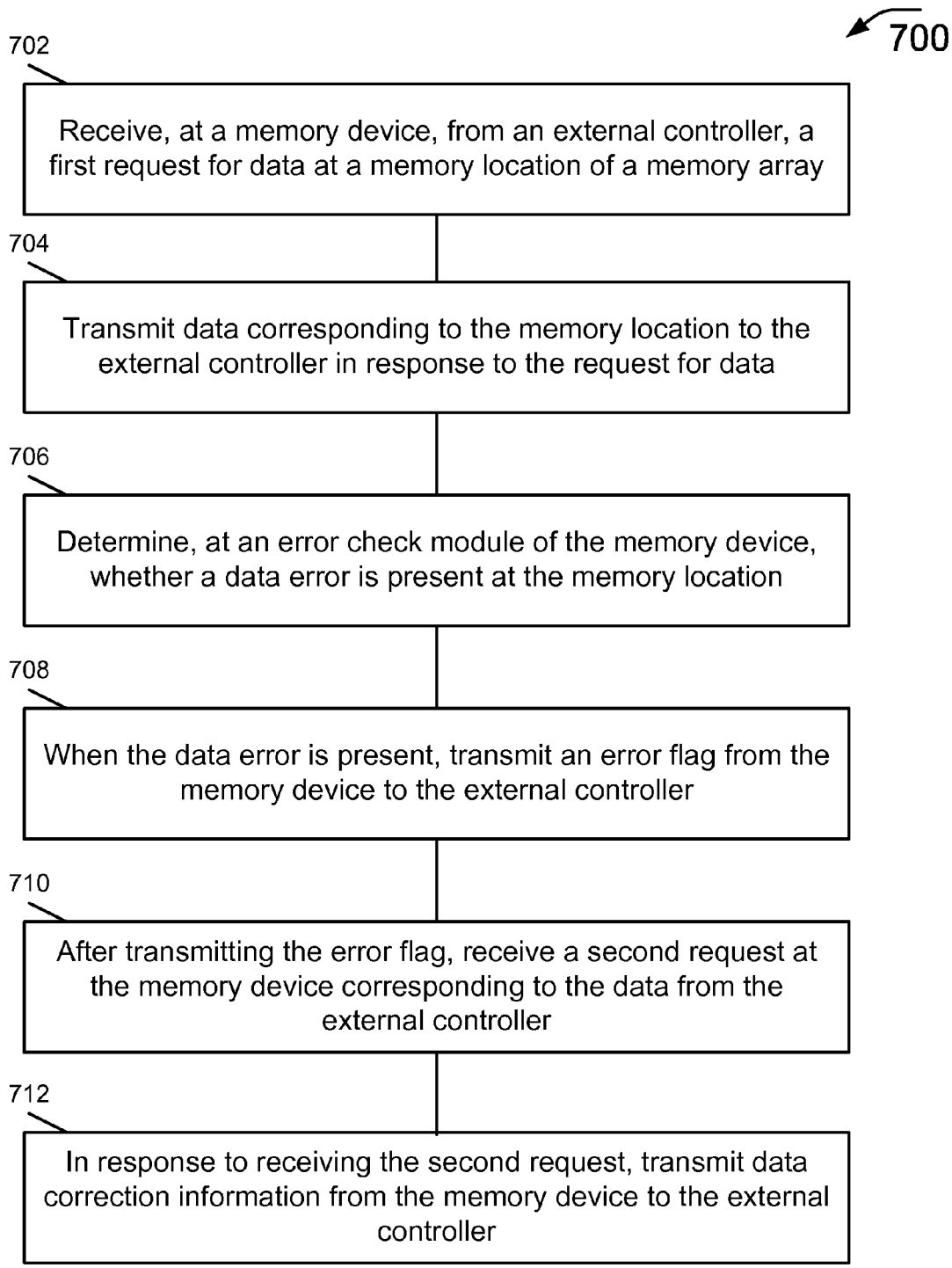
FIG. 7 is a flowchart of an embodiment of a method of managing error correction and data delivery.

FIG. 7 is a flowchart of an embodiment of a method 700 of managing error correction and data delivery. At 702, a first request for data may be data at a memory location of a memory array may be received at a memory device from an external controller. Data corresponding to the memory location may be transmitted at 704 to the external controller in response to the request for data.

An error check module of a memory device may determine at 706 whether a data error is present at the memory location. Where a data error is present, an error flag may be transmitted at 708 from the memory device to the external controller. After the error flag has been transmitted, a second request may be received at 710 at the memory device corresponding to the data from the external controller. In response to receiving the second request, data correction information may be transmitted at 712 from the memory device to the external controller.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. An apparatus comprising:
a controller;
a memory device coupled to the controller, the memory device comprising:
a memory array configured to store data;
an input-output port configured to receive, from the controller, a first request for data at a memory location of the memory array and to transmit, to the controller, the data at the memory location in response to the first request for data; and
an error check module configured to determine whether a data error is present in the data at the memory location; and
an error pin configured to transmit an error flag to the controller in response to receiving a signal from the error check module indicating that the data error is present, the controller configured to correct the data error, wherein, after transmitting the error flag, the input-output port is configured to transmit data correction information in response to receiving a second request corresponding to the data.

2. The apparatus of claim 1, wherein the error pin is a dedicated error pin.

3. The apparatus of claim 1, wherein the error pin is a shared error pin.

4. The apparatus of claim 3, wherein the shared error pin is further configured to transmit a parity error signal, a cyclic redundancy check error, or a combination thereof.

5. A computer readable storage device storing instructions that, when executed by a processor, cause the processor to:
receive, at a memory controller of a memory device, from a controller, a first request for data at a memory location of a memory array;
transmit data corresponding to the memory location to the controller in response to the first request for data;
determine, at the controller, whether a data error is present in the data at the memory location;
when the data error is present, transmit an error flag to the controller;
after transmitting the error flag, receive a second request corresponding to the data from the controller;
in response to receiving the second request, transmit data correction information to the controller, the controller configured to correct the data error; and
set an open drain driver pin that is shared by a plurality of devices, the open drain driver pin indicating that the data error is at the memory location.

6. The computer readable storage device of claim 5, wherein the data correction information comprises error information or corrected data.

7. The computer readable storage device of claim 5, wherein the data error is determined to be present during a first time, and wherein transmission of the error flag is initiated during a second time that is not immediately after the first time.

8. An apparatus comprising:
a memory device configured to:
perform error checking, wherein the error checking is performed concurrently with data output;
determine whether a data error has occurred at a memory location; and
store error log information in response to a determination that the data error has occurred; and
a controller coupled to the memory device, the controller configured to:
correct the data error in response to the determination by the memory device that the data error has occurred; and
copy stored error log information of the memory device to a buffer included in the controller.

9. The apparatus of claim 8, wherein the error log information includes redundant bits.

10. The apparatus of claim 8, wherein the memory device is further configured to set a pin in response to the determination that the data error has occurred, and wherein the pin is shared by a plurality of devices.

11. The apparatus of claim 8, wherein a depth of the buffer is based on how late an error flag is sent in relation to the data output, and wherein the controller is further configured to receive the error flag.

12. The apparatus of claim 8, wherein corrected data is associated with the memory location.

13. The apparatus of claim 12, wherein the corrected data is stored in a register distinct from a memory array, and wherein the register and the memory array are included in the memory device.

* * * * *